United States Patent
Rook et al.

(10) Patent No.: US 8,616,345 B2
(45) Date of Patent: Dec. 31, 2013

(54) SYSTEMS AND METHODS FOR BRAKE WHIRL MITIGATION

(75) Inventors: Todd Rook, Tipp City, OH (US); Ravindra Uppar, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 13/168,758

(22) Filed: Jun. 24, 2011

(65) Prior Publication Data
US 2012/0325594 A1 Dec. 27, 2012

(51) Int. Cl.
*F16D 55/36* (2006.01)

(52) U.S. Cl.
USPC ... 188/71.5; 188/71.4; 188/73.39; 188/73.37; 188/73.1

(58) Field of Classification Search
USPC .............................................. 188/71.5, 73.39
See application file for complete search history.

(56) References Cited

U.S. PATENT DOCUMENTS 5,310,025 A * 5/1994 Anderson .................. 188/73.37
5,323,881 A 6/1994 Machan et al.
6,257,376 B1 * 7/2001 Borgeaud et al. ............ 188/71.5
6,752,248 B2 * 6/2004 Berwanger ................ 188/73.39
2010/0140027 A1 * 6/2010 Baden .......................... 188/71.5

FOREIGN PATENT DOCUMENTS

| EP | 239431 A1 * | 9/1987 |
| EP | 0716244 | 6/1996 |
| GB | 2320747 | 7/1998 |
| WO | 9402753 | 2/1994 |

OTHER PUBLICATIONS

Search Report dated Jun. 18, 2012 in Application No. GB1203162.1.

* cited by examiner

*Primary Examiner* — Robert A Siconolfi
*Assistant Examiner* — Mahbubur Rashid
(74) *Attorney, Agent, or Firm* — Snell & Wilmer, L.L.P.

(57) ABSTRACT

Systems and methods for whirl mitigation in an aircraft braking system are provided. For example, an apparatus is provided comprising a brake disk stack including a torque tube having a first axial end and a second axial end, a back leg near a first axial end of the torque tube, and a circumferentially disposed spline extending from the back leg towards the second axial end of the torque tube.

10 Claims, 4 Drawing Sheets

SYSTEMS AND METHODS FOR BRAKE WHIRL MITIGATION

FIELD

The present disclosure is related to systems and methods for brake whirl mitigation, for example, as found in an aircraft brake.

BACKGROUND

Aircraft brakes tend to vibrate during use. Aircraft brakes may exhibit the whirl mode of vibration ("whirl") and/or the squeal mode of vibration ("squeal"). Squeal may be understood as a torsional motion of the non-rotating brake parts about the axle. Whirl may be understood as a wobble outside the rotational plane between a torque plate and a backleg. Whirl typically occurs in the range of about 200 Hz to about 500 Hz. While it is desirable to mitigate both squeal and whirl, whirl is potentially more damaging than squeal. Thus, there exists a need for systems and methods that assist in whirl mitigation.

SUMMARY

Systems and methods disclosed herein may be useful for use in aircraft brakes. In this regard, an apparatus is provided comprising a brake disk stack including a torque tube having a first axial end and a second axial end, a back leg near a first axial end of the torque tube, and a circumferentially disposed spline extending from the back leg towards the second axial end of the torque tube.

Moreover, an apparatus is provided comprising a torque tube having an outer surface, a first axial end and a second axial end, a back leg at a first axial end of the brake disk stack, and a first stiffening member coupled to the back leg and the outer surface.

In further embodiments, a method is provided comprising fabricating a torque tube having a first axial portion, a second axial portion, and a back leg disposed closer to the first axial portion than the second axial portion, and fabricating a first circumferentially disposed spline extending from the back leg towards the second axial portion.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for aircraft brakes. Although the embodiments herein are described with reference to aircraft components, such embodiments are provided as examples only, as it is contemplated that the disclosures herein have applicability to other vehicles and braking systems.

An aircraft brake generally comprises a friction brake mechanism including a pressure plate adjacent to a means for exerting force such as hydraulic piston motor or one or more electromechanical actuators. An aircraft brake typically further comprises an end plate distal from the means for exerting force and a plurality of interleaved rotor disks and stator disks which together form the brake heat sink. The friction brake mechanism also generally includes a torque tube and a back leg on which a pressure plate, end plate and stator disks are slidably mounted against rotation relative to the wheel and rotor disks. Whirl may occur between the end plate and the back leg, among other places.

Figure 1:
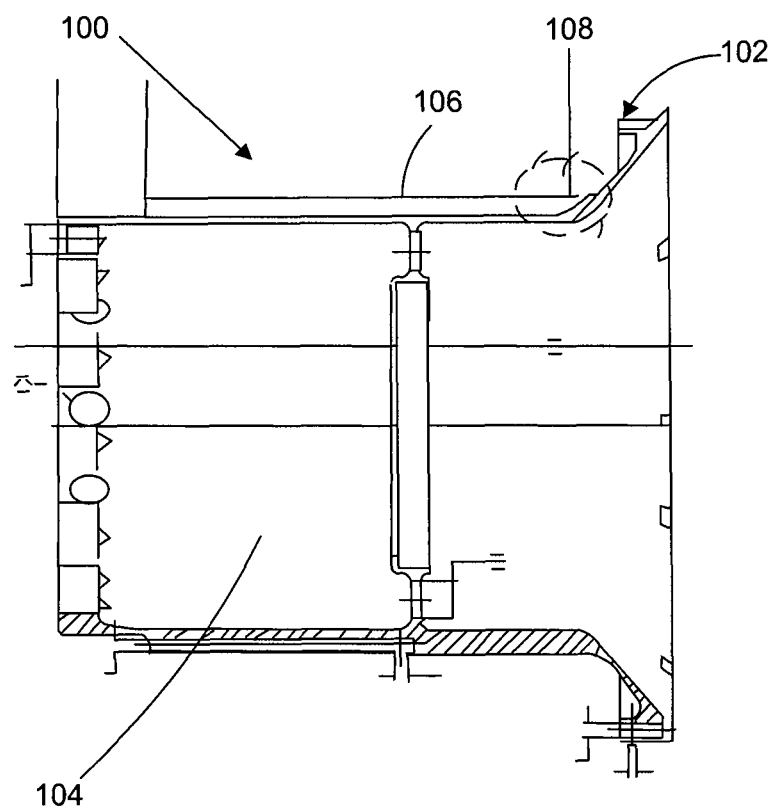
FIG. 1 illustrates a cross sectional view of an aircraft brake in accordance with an embodiment.
Figure 3:
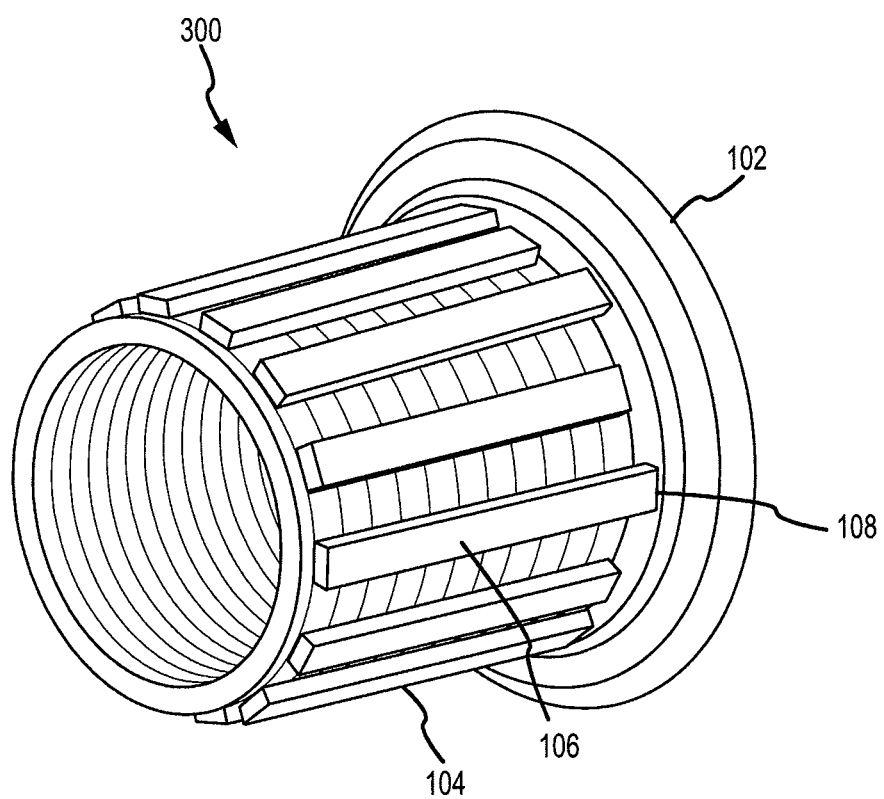
FIG. 3 illustrates a three dimensional view of an aircraft brake in accordance with an embodiment.

As shown in FIG. 1, torque tube 104 has back leg 102. The back leg 102 may be made integral with the torque tube 104 as shown in FIG. 1, or a back leg may be made as a separate component and suitably connected to the torque tube 104. Torque tube 104 has a plurality of circumferentially disposed splines that are axially extending, such as extended spline 106. The circumferentially disposed splines, including extended spline 106, are also shown in FIG. 3.

The circumferentially disposed splines may be formed integral to the torque tube. For example, the circumferentially disposed splines may be formed during casting or forging of a torque tube. In various embodiments, one or more of the circumferentially disposed splines may be machined, ground, or otherwise eroded to alter the length of the spline to a selected length.

As discussed above, whirl may be understood as a wobble outside the rotational plane between a back leg and an end plate, a wheel, a rotor, or a combination thereof. Conventional thought holds that decoupling components mitigates whirl. Stated another way, it was believed that reducing the mechanical connection between two components would reduce whirl. In this regard, increased coupling was conventionally thought to lead to one or more components vibrating at the same frequency. Thus, it was believed that increased coupling would produce greater potential combinations of whirl modes that would tend to produce a single, more undesirable whirl. Potentially, such additive effects could lead to one or more components resonating at certain frequencies. The increased amplitude of vibration associated with resonation would also be an undesirable effect in an aircraft brake. Thus, to enhance decoupling, conventional circumferentially disposed splines on a torque tube would not extend to the back leg. Without such extension, the torque tube and back leg would remain less coupled, and it was believed that this arrangement would reduce whirl.

Unexpectedly, the present inventors have discovered systems and methods of increasing coupling between certain components that may mitigate or otherwise reduce whirl. Stated another way, by increasing stiffness between certain aircraft brake components (e.g., by using a stiffening member), whirl may be reduced or mitigated. A stiffening member (e.g., an extended spline) may be used to couple one or more components or portions of a component to reduce whirl.

In various embodiments, with reference to FIG. 1, extended spline 106 is in contact with back leg 102 at point 108. Extended spline 106 extends from the back leg at point 108 towards the axial end of torque tube 104 opposite back leg 102. In this manner, extended spline 106 acts as a stiffening member to stiffen the coupling between torque tube 104 and back leg 102.

With momentary reference to FIG. 3, a plurality of circumferentially disposed splines is shown, of which one is extended spline 106. The plurality of circumferentially disposed splines may comprise any suitable number of splines. The number of splines selected may be influenced by torque tube diameter, desired final weight of a brake assembly, and other relevant factors. In various embodiments, the plurality of circumferentially disposed splines may comprise about 1 to about 100, preferably from about 1 to about 50, and more preferably from about 1 to about 20.

In various embodiments, only a portion of the splines in the plurality of circumferentially disposed splines extend to a back leg. In such embodiments, splines that extend to the back leg may be referred to as an extended spline, while splines that do not come into contact with the back leg may be referred to as a short spline. While, in certain embodiments, all splines in the plurality of circumferentially disposed splines extend to a back leg, commercially significant reduction of whirl may be accomplished with fewer than all splines in the plurality of circumferentially disposed splines. Indeed, in various embodiments, a single extended spline is used in conjunction with additional, nonextended splines.

The selection of the ratio of extended splines to nonextended splines may be influenced by the amount of whirl reduction desired and the desired final weight of the aircraft brake assembly. Extended splines tend to add more weight than nonextended splines, as extended splines tend to have a greater length than nonextended splines, although in various embodiments extended splines may be produced having the same mass as nonextended splines. Whirl reduction may be observed with the use of a single extended spline, although more significant whirl reduction may be observed with additional extended splines. In various embodiments, the ratio of extended splines to nonextended splines may range between 1:0 to about 1:50, preferably from about 1:1 to about 1:10 and more preferably from about 1:3 to about 1:9.

Figure 2:
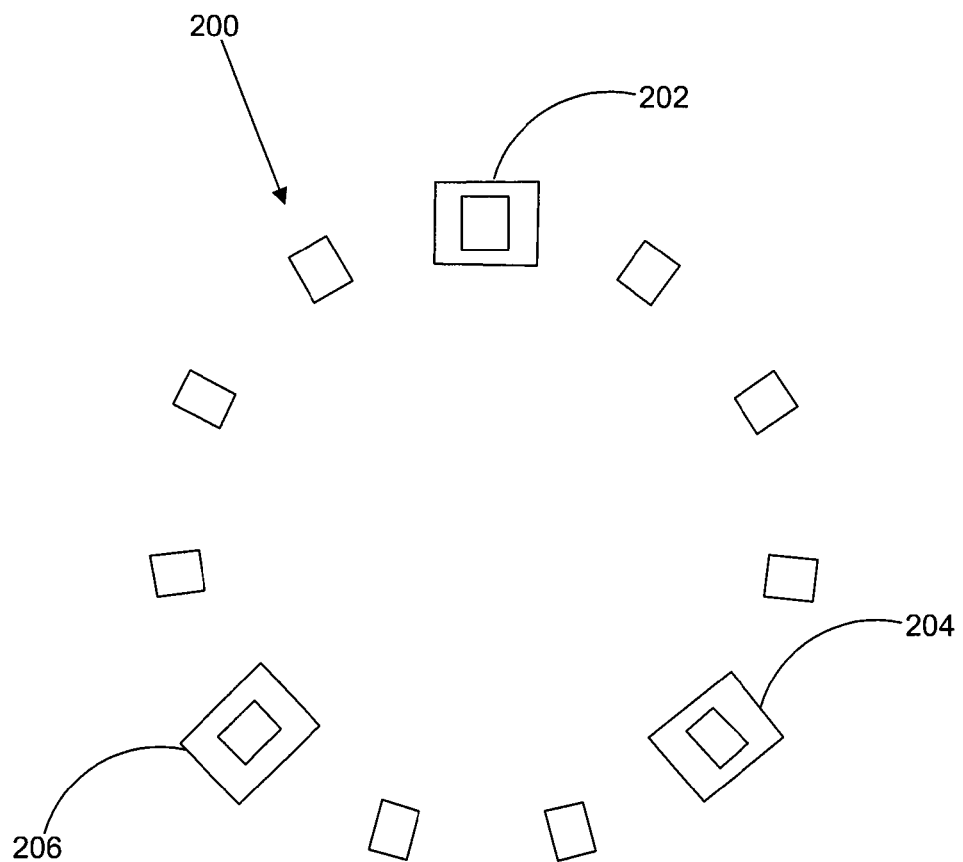
FIG. 2 illustrates an axial view of the aircraft brake of FIG. 1.

In various embodiments, the extended splines are disposed about the torque tube in a symmetrical configuration, though such configuration is not present in further embodiments. For example, with reference to FIG. 2, extended splines and nonextended splines are shown disposed about a torque tube as viewed from an axial perspective. Each single square in FIG. 2 depicts a nonextended spline. For example, nonextended spline 208 does not contact a back leg. Extended splines 202, 204 and 206 are depicted as a square within a rectangle. As shown in FIG. 2, extended splines 202, 204 and 206 are distributed symmetrically about a torque tube. Thus, extended spline 202 is disposed 120 degrees from extended spline 204, which itself is disposed 120 degrees from extended spline 206. In further embodiments, extended splines are symmetrically disposed in varying configurations, such as, for example, every 60 degrees, every 72 degrees, and every 180 degrees.

As shown in FIG. 3, only a portion of the splines in the plurality of circumferentially disposed splines extend to back leg 102. In the embodiment depicted in FIG. 3, the ratio of extended splines to nonextended splines is 1:1.

Without limiting the scope of the present disclosure, empirical data collected indicates that commercially significant whirl mitigation may occur in an embodiment having three extended splines.

Figure 4:
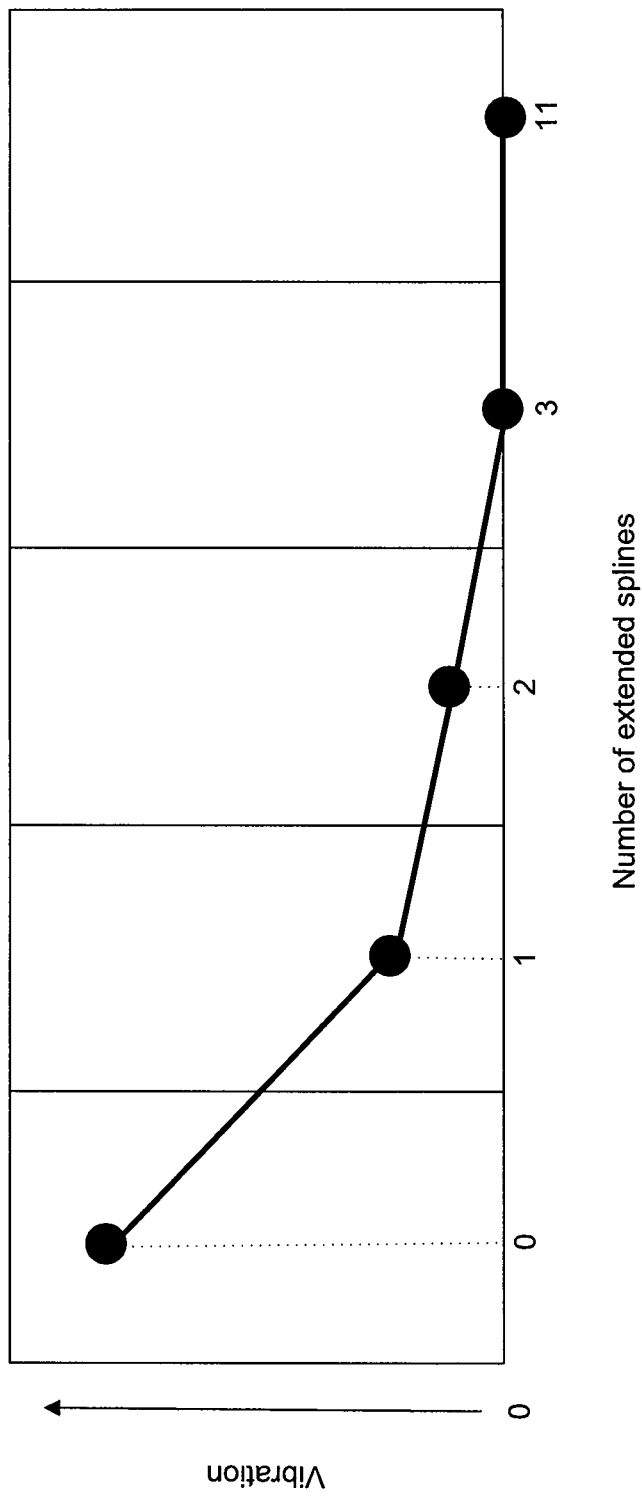
FIG. 4 illustrates a graph of vibration on the y axis and number of extended splines on the x axis.

With reference to FIG. 4, a graph of vibration amplitude at 200 Hz as a function of the number of extended splines is shown in a system having eleven splines. Testing is performed using a system with eleven total splines. Testing included a system with no extended splines, one extended spline, two extended splines, three extended splines, and eleven extended splines. Vibration amplitude at a frequency of 200 Hz is measured. As shown in FIG. 4, in a system where no spline is extended, vibration (in this case, whirl), is present at the illustrated level. Where one spline is extended, significant vibration mitigation is achieved. Vibration mitigation is improved in the system having two extended splines and still further in the system having three extended splines. There does not appear to be an appreciable gain in vibration mitigation in the system having eleven extended splines compared to the system having three extended splines.

In various embodiments, an extended spline may be combined with other features to mitigate various vibration modes. For example, a back leg may contain asymmetrical cut-outs or apertures. In such embodiments, the asymmetrical cut-outs or apertures may mitigate certain vibration modes.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
   a brake disk stack including a torque tube having a first axial end, a second axial end, and a diameter;
   a back leg near the first axial end of the torque tube;

a plurality of first circumferentially disposed splines extending from the back leg towards the second axial end of the torque tube;

a plurality of second circumferentially disposed splines not in contact with the back leg, wherein each of the plurality of first cirumferentially disposed splines is disposed asymmetrically about the diameter relative to each of the plurality of second circumferentially disposed splines, and wherein the plurality of first circumferentially disposed splines and the plurality of second circumferentially disposed splines comprise an entirety of circumferentially disposed splines on the torque tube.

2. The apparatus of claim 1, wherein the ratio of the number of splines in the plurality of first circumferentially disposed splines to the number of splines in the plurality of second circumferentially disposed splines is 1:1.

3. The apparatus of claim 1, wherein the back leg includes a plurality of apertures arranged asymmetrically around the axis of the torque tube.

4. The apparatus of claim 1, wherein the back leg is integrally formed with the torque tube.

5. A method comprising:

fabricating a torque tube having a circumference, a first axial portion, a second axial portion, and a back leg disposed closer to the first axial portion than the second axial portion; and fabricating a plurality of first circumferentially disposed splines extending from the back leg towards the second axial portion;

fabricating a plurality of second circumferentially disposed splines, wherein the second circumferentially disposed spline is not in contact with the back leg, wherein each of the plurality of first circumferentially disposed splines is disposed asymmetrically about the diameter relative to each of the plurality of second circumferentially disposed splines, and wherein the first plurality of circumferentially disposed splines and the second plurality of circumferentially disposed splines comprise an entirety of circumferentially disposed splines on the torque tube.

6. The method of claim 5, wherein the plurality of second circumferentially disposed splines is not in contact with the back leg.

7. The method of claim 5, further comprising disposing a plurality of apertures arranged asymmetrically around the axis of the brake disk stack.

8. The method of claim 5, coupling the back leg with a torque tube.

9. An apparatus comprising:

a torque tube having a diameter, an outer surface, a first axial end and a second axial end;

a back leg at a first axial end of the brake disk stack, and a plurality of first stiffening members coupled to the back leg and the outer surface;

a plurality of second stiffening members disposed on the outer surface, wherein each of the plurality of first stiffening members is disposed asymmetrically about the diameter relative to each of the plurality of second stiffening members, and wherein the plurality of first stiffening members and the plurality of second stiffening members comprise an entirety of stiffening members on the torque tube.

10. The apparatus of claim 9, wherein the back leg is integrally formed with the torque tube.

\* \* \* \* \*